United States Patent
Hsu et al.

(10) Patent No.: US 9,218,097 B2
(45) Date of Patent: Dec. 22, 2015

(54) CAPACITIVE TOUCH DEVICE CAPABLE OF AVOIDING REDUCED FRAME RATE AND SENSING METHOD THEREOF

(71) Applicant: SILICON INTEGRATED SYSTEMS CORP, Hsinchu (TW)

(72) Inventors: Jih-Ming Hsu, Hsinchu (TW); Chia-Yi Chu, Hsinchu (TW)

(73) Assignee: SILICON INTEGRATED SYSTEMS CORP, Hsinchu (TW)

( * ) Notice: Subject to any disclaimer, the term of this patent is extended or adjusted under 35 U.S.C. 154(b) by 78 days.

(21) Appl. No.: 14/068,589

(22) Filed: Oct. 31, 2013

(65) Prior Publication Data

US 2015/0116256 A1    Apr. 30, 2015

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ..................... G06F 3/0416; G06F 2203/04104
USPC ........................................... 345/156, 173–178
See application file for complete search history.

(56) References Cited

U.S. PATENT DOCUMENTS

2011/0050603 A1\* 3/2011 Park ................................ 345/173
2012/0293453 A1\* 11/2012 Yamada et al. ................ 345/174

\* cited by examiner

*Primary Examiner* — Ram Mistry
(74) *Attorney, Agent, or Firm* — Hauptman & Ham, LLP

(57) ABSTRACT

A capacitive touch device and a sensing method thereof are disclosed. The capacitive touch device includes a touch panel and a plurality of touch detection units. The touch panel includes first sensing lines and second sensing lines. The position of a touch between a last one of the first sensing lines and a first one of the second sensing lines is calculated according to sensed values respectively corresponding to a first sensing line prior to the last one of the first sensing lines, the last one of the first sensing lines and the first one of the second sensing lines. The present invention is capable of avoiding the problem that the frame rate is reduced significantly because of the data transmission between the first and second touch detection units.

12 Claims, 10 Drawing Sheets

CAPACITIVE TOUCH DEVICE CAPABLE OF AVOIDING REDUCED FRAME RATE AND SENSING METHOD THEREOF

TECHNICAL FIELD OF THE INVENTION

The present invention relates to a capacitive touch device, more particularly, to a capacitive touch device and a sensing method thereof.

BACKGROUND OF THE INVENTION

When a capacitive touch panel is applied to a large scale device, a number of sensing lines is increasing. Furthermore, requirements for accelerating sensing speed and calculating scan results are also increasing.

In an axis intersect (AI) capacitance sense technology, a coordinate of a touch is detected by a self-capacitance sensing method. However, a problem of ghost point occurs in the AI capacitance sense technology. As a result, a multi-point touch cannot be detected. In contrast, in an all-points addressable (APA) capacitance sense technology, a coordinate of a touch is usually detected by a mutual-capacitance sensing method. Accordingly, a multi-point touch can be detected in the APA capacitance sense technology.

Please refer to FIG. 1. FIG. 1 is a conventional capacitive touch device 10 by utilizing the AI capacitance sense technology. The capacitive touch device 10 comprises a touch panel 100 and a plurality of touch integrated circuits (IC) 102, 104. The touch panel 100 comprises a plurality of sensing lines S1-S20. The touch IC 102 is electrically coupled to the sensing lines S1-S10 for scanning the sensing lines S1-S10. The touch IC 104 is electrically coupled to the sensing lines S11-S20 for sensing the sensing lines S11-S20. Please refer to FIG. 2. FIG. 2 is a schematic diagram showing that the sensing lines S8-S13 and the touch ICs 102, 104 in FIG. 1. The sensing lines S10, S11 are regarded as boundary sensing lines. In the capacitive touch device 10, the position of a touch is determined by sensing two adjacent sensing lines. For example, the sensing lines S8 and S9 are charged and discharged for acquiring two analog-to-digital (ADC) values of the sensing lines S8 and S9. Then, the position of a touch between the sensing lines S8 and S9 is determined by the ADC values of the sensing lines S8 and S9. Similarly, the position of a touch between the sensing lines S9 and S10 is determined by ADC values of the sensing lines S9 and S10. The position of a touch between the sensing lines S10 and S11 is determined by ADC values of the sensing lines S10 and S11. However, the touch IC 102 is not electrically coupled to the sensing line S11, and thus the touch IC 102 cannot acquire the ADC values of the sensing line S11. When the position of the touch (between the sensing lines S10 and S11) is determined by only the ADC values of the sensing line S10, it is incorrect or small. In order to determine the correct position, the ADC values of the sensing line S11 acquired by the touch IC 104 is transmitted to the touch IC 102, such that the touch IC 102 is capable of determining the position between the sensing lines S10 and S11 by utilizing the ADC values of the sensing lines S10 and S11. Because the ADC values of the sensing line S11 have to be transmitted to the touch IC 102, the frame rate of the touch panel 100 is reduced significantly and thus performance of the capacitive touch device 10 is worse. For all-points addressable (APA) capacitance sense technology, a row of ADC values have to be transmitted to the touch IC 102, such performance suffering will become worst as well.

Therefore, there is a need for a solution to solve the above-mentioned problem that the frame rate is reduced significantly because one of two adjacent touch ICs transmits the ADC values of one boundary sensing line to the other of the two adjacent touch ICs.

SUMMARY OF THE INVENTION

An objective of the present invention is to provide a capacitive touch device and a sensing method thereof.

In accordance with an aspect of the present invention, the capacitive touch device comprises a touch panel and a plurality of touch detection units. The touch panel comprises a plurality of first sensing lines and a plurality of second sensing lines. The touch detection units at least comprise a first touch detection unit and a second touch detection unit. The first touch detection unit is electrically coupled to the first sensing lines. The second touch detection unit is electrically coupled to the second sensing lines. At least a last one of the first sensing lines is further electrically coupled to the second touch detection unit. At least a first one of the second sensing lines is further electrically coupled to the first touch detection unit. A position of a touch between the last one of the first sensing lines and the first one of the second sensing lines is calculated according to a sensed value corresponding to a first sensing line prior to the last one of the first sensing lines, a sensed value corresponding to the last one of the first sensing lines and a sensed value corresponding to the first one of the second sensing lines.

In accordance with another aspect of the present invention, the sensing method of the capacitive touch device of the present invention comprises: scanning a first sensing line prior to the last one of the first sensing lines for obtaining a sensed value corresponding to the first sensing line prior to the last one of the first sensing lines with the first touch detection unit; scanning the last one of the first sensing lines for obtaining a sensed value corresponding to the last one of the first sensing lines and scanning the first one of the second sensing lines for obtaining a sensed value corresponding to the first one of the second sensing lines with the first and second touch detection units; and calculating a position of a touch between the last one of the first sensing lines and the first one of the second sensing lines according to the sensed value corresponding to the first sensing line prior to the last one of the first sensing lines, the sensed value corresponding to the last one of the first sensing lines and the sensed value corresponding to the first one of the second sensing lines.

The capacitive touch device and the sensing method of the capacitive touch device are capable of avoiding the problem that the frame rate is reduced significantly because of the data transmission between two adjacent touch detection units.

BRIEF DESCRIPTION OF THE DRAWINGS

The present invention will be described in detail in conjunction with the appending drawings, in which.

DETAILED DESCRIPTION OF THE INVENTION

Figure 3:
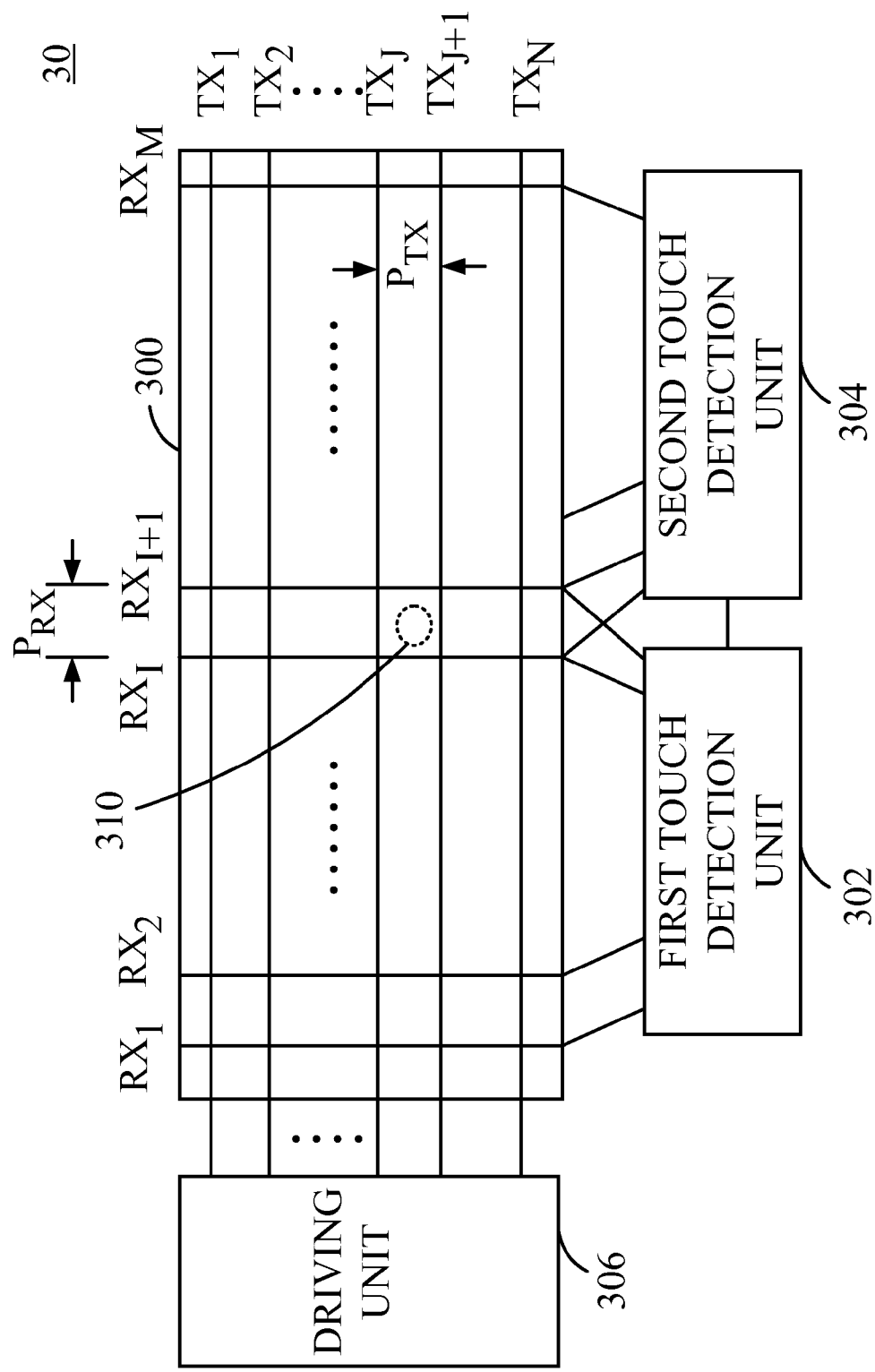
FIG. 3 is a capacitive touch device of the present invention.

FIG. 3 is a capacitive touch device 30 of the present invention. The capacitive touch device 30 comprises a touch panel 300, a plurality of touch detection units comprising a first touch detection unit 302 and a second touch detection unit 304, and at least one driving unit 306. The touch panel 300 comprises a plurality of first sensing lines $RX_1$-$RX_I$, a plurality of second sensing lines $RX_{I+1}$-$RX_M$, and a plurality of driving lines $TX_1$-$TX_N$. The first sensing lines $RX_1$-$RX_I$ and the second sensing lines $RX_{I+1}$-$RX_M$ are arranged in a column direction. The driving lines $TX_1$-$TX_N$ are arranged crossing over the first and second sensing lines $RX_1$-$RX_M$ in a row direction. The column direction is perpendicular to the row direction. I, J, M and N are positive integers. The first touch detection unit 302 is electrically coupled to the first sensing lines $RX_1$-$RX_I$ for scanning the sensing lines $RX_1$-$RX_I$. The second touch detection unit 304 is electrically coupled to the second sensing lines $RX_{I+1}$-$RX_M$ for scanning the sensing lines $RX_{I+1}$-$RX_M$. In the present invention, at least a last one of the first sensing lines $RX_1$-$RX_I$ is further electrically coupled to the second touch detection unit 304. That is, the first sensing lines $RX_1$ is further electrically coupled to the second touch detection unit 304. At least a first one of the second sensing lines $RX_{I+1}$-$RX_M$ is further electrically coupled to the first touch detection unit 302. That is, the second sensing lines $RX_{I+1}$ is further electrically coupled to the first touch detection unit 302. Specifically, the first sensing line $RX_1$ and the second sensing line $RX_{I+1}$ are boundary sensing lines and both of the first and second touch detection units 302, 304 are electrically coupled to the boundary sensing lines. The driving unit 306 is electrically coupled to the driving lines $TX_1$-$TX_N$ for sequentially driving the driving lines $TX_1$-$TX_N$. A position (i.e. a coordinate) of a touch 310 between the last one (i.e. the first sensing line $TX_I$) of the first sensing lines $RX_1$-$RX_I$ and the first one (i.e. the second sensing line $TX_{I+1}$) of the second sensing lines $RX_{I+1}$-$RX_M$ is calculated by a sensed value corresponding to the first sensing line $RX_{I-1}$ prior to the last one (i.e. the first sensing line $TX_I$) of the first sensing lines $RX_1$-$RX_I$, a sensed value corresponding to the last one (i.e. the first sensing line $TX_1$) of the first sensing line $RX_I$ and a sensed value corresponding to the first one (i.e. the second sensing line $TX_{I+1}$) of the second sensing lines $RX_{I+1}$-$RX_M$. This will be described in detail later.

Before the touch 310 is detected, an initial data matrix is required to be stored in advance. The initial data matrix contains sensed values scanned by the driving lines $TX_1$-$TX_N$, the first sensing lines $RX_1$-$RX_I$ and the second sensing lines $RX_{I+1}$-$RX_M$ when there is no touch. More particularly, the driving unit 306 provides a driving signal for the driving line $TX_1$, and the first and second touch detection units 302, 304 respectively scan the first and second sensing lines $RX_1$-$RX_M$ for acquiring the sensed values. Then, the driving unit 306 provides the driving signal for the driving line $TX_2$, and the first and second touch detection units 302, 304 respectively scan the first and second sensing lines $RX_1$-$RX_M$ for acquiring the sensed values. In the same manner, the driving lines $TX_3$-$TX_N$ are sequentially driven by the driving unit 306, and the first and second touch detection units 302, 304 respectively scan the first and second sensing lines $RX_1$-$RX_M$ for acquiring the sensed values. After all of the driving lines $TX_1$-$TX_N$ and all of the first and second sensing lines $RX_1$-$RX_M$ are scanned, the initial data matrix is obtained and stored.

Figure 4:
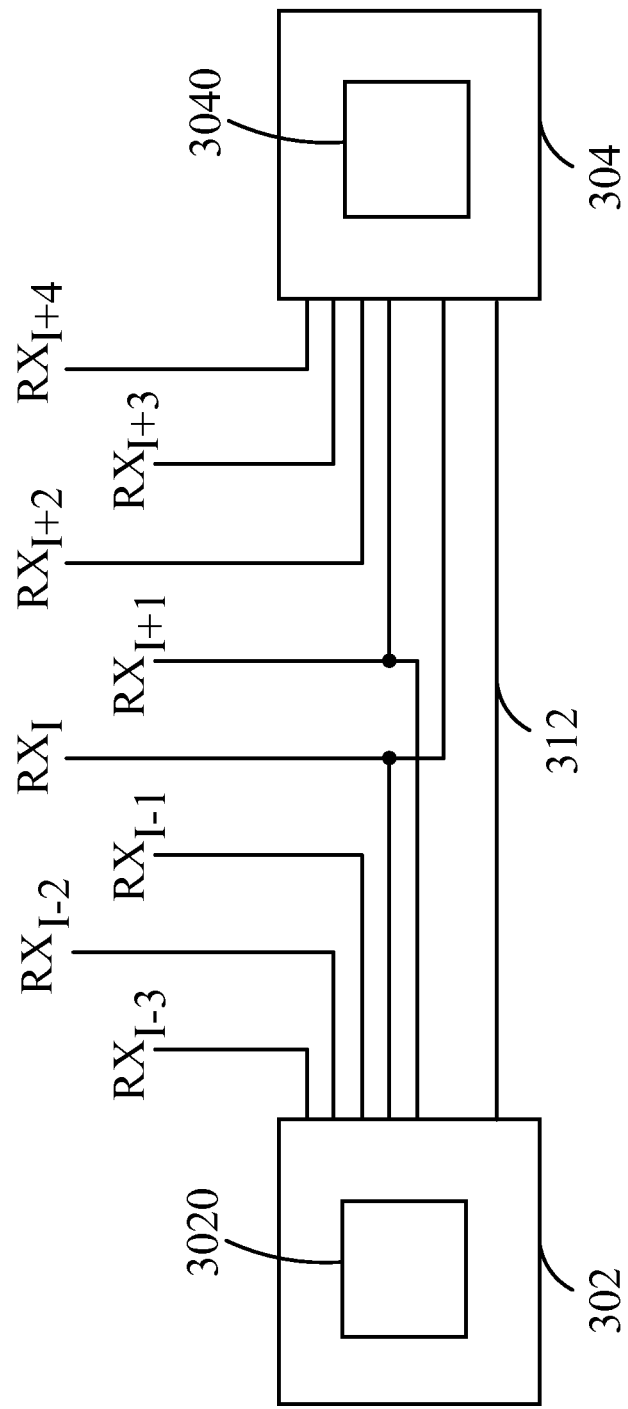
FIG. 4 is a schematic diagram showing that first sensing lines $RX_{I-3}$-$RX_I$, second sensing lines $RX_{I+1}$-$RX_{I+4}$ and the first and second touch detection units in FIG. 3 according to a first embodiment of the present invention.

Please refer to FIG. 3 and FIG. 4. FIG. 4 is a schematic diagram showing that the first sensing lines $RX_{I-3}$-$RX_I$, the second sensing lines $RX_{I+1}$-$RX_{I+4}$ and the first and second touch detection units 302, 304 in FIG. 3 according to a first embodiment of the present invention. When the touch 310 occurs as shown in FIG. 3, the driving lines $TX_1$-$TX_N$ are sequentially driven by the driving unit 306 and sensed values of the first and second sensing lines $RX_1$-$RX_M$ are sensed by the first and second sensing units 302, 304 in the same manner as the steps for obtaining the initial data matrix. After all of the driving lines $TX_1$-$TX_N$ are sequentially driven and the first and second sensing lines $RX_1$-$RX_M$ are scanned, a current data matrix is obtained. The current data matrix contains the sensed values scanned by the first and second touch detection units 302, 304 when the touch 310 occurs. Then, a data difference matrix containing a plurality of difference values can be obtained by comparing the initial data matrix (there is no touch) with the current data matrix (the touch 310 occurs). The touch 310 can be detected according to the data difference matrix. More particularly, when one difference value in the difference value matrix is greater than a predetermined threshold value, a touch corresponding to said one difference value greater than the predetermined threshold value is detected.

After the touch 310 is detected, the capacitive touch device 30 of the present invention provides an interpolation method to determine a position (i.e. a coordinate) of the touch 310. Assuming that the touch 310 is positioned between the first sensing line $RX_I$ and the second sensing line $RX_{I+1}$ and between the driving line $TX_J$ and the driving line $TX_{J+1}$, the position (POS_RX, POS_TX) of the touch 310 can be calculated as follows. POS_RX is calculated according to the following equation (1):

$$POS\_RX = \frac{(POS_{I-1} \times DIFF_{(I-1,J)}) + (POS_I \times DIFF_{(I,J)}) + (POS_{I+1} \times DIFF_{(I+1,J)})}{(DIFF_{(I-1,J)} + DIFF_{(I,J)} + DIFF_{(I+1,J)})} \quad (1)$$

$POS_{I-1}$ is the position of the first sensing line $RX_{I-1}$. $DIFF_{(I-1,J)}$ is a difference value corresponding to the first sensing line $RX_{I-1}$ and the driving line $TX_J$. $POS_I$ is the position of the first sensing line $RX_I$. $DIFF_{(I,J)}$ is a difference value corresponding to the first sensing line $RX_I$ and the driving line $TX_J$. $POS_{I+1}$ is the position of the second sensing line $RX_{I+1}$. $DIFF_{(I+1,J)}$ is a difference value corresponding to the second sensing line $RX_{I+1}$ and the driving line $TX_J$. Specifically, $DIFF_{(I-1,J)}$, $DIFF_{(I,J)}$ and $DIFF_{(I+1,J)}$ are difference values between the sensed value when the touch 310 occurs and the sensed value when there is no touch. Since a pitch $P_{RX}$ between any two adjacent sensing lines is the same, the equation (1) is rewritten as the following equation (2):

$$POS\_RX = \frac{[(POS_I - P_{RX}) \times DIFF_{(I-1,J)}] + POS_I \times \\ DIFF_{(I,J)} + [(POS_I + P_{RX}) \times DIFF_{(I+1,J)}]}{(DIFF_{(I-1,J)} + DIFF_{(I,J)} + DIFF_{(I+1,J)})} \quad (2)$$

$$= \frac{POS_I \times (DIFF_{(I-1,J)} + DIFF_{(I,J)} + \\ DIFF_{(I+1,J)}) + P_{RX} \times (DIFF_{(I+1,J)} - DIFF_{(I-1,J)})}{(DIFF_{(I-1,J)} + DIFF_{(I,J)} + DIFF_{(I+1,J)})}$$

$$= POS_I + \frac{P_{RX} \times (DIFF_{(I+1,J)} - DIFF_{(I-1,J)})}{(DIFF_{(I-1,J)} + DIFF_{(I,J)} + DIFF_{(I+1,J)})}$$

Furthermore, the difference value $DIFF_{(I,J)}$ corresponding to the first sensing line $RX_I$ (the middle sensing line among the first sensing line $RX_{I-1}$, the first sensing line $RX_I$ and the second sensing line $RX_{I+1}$) and the driving line $TX_J$ can be multiplied by a weighting factor $W_{RX}$ for adjusting influence of the difference value $DIFF_{(I,J)}$, so as to improve accuracy of POS_RX. The weighting factor $W_{RX}$ is ranged from 0 to 1. Accordingly, the equation (2) is rewritten as the following equation (3):

$$POS\_RX = POS_I + \frac{P_{RX} \times (DIFF_{(I+1,J)} - DIFF_{(I-1,J)})}{(DIFF_{(I-1,J)} + W_{RX} \times DIFF_{(I,J)} + DIFF_{(I+1,J)})} \quad (3)$$

In the same manner, POS_TX can be calculated according to the following equation (4):

$$POS\_TX = POS_J + \frac{P_{TX} \times (DIFF_{(I,J+1)} - DIFF_{(I,J-1)})}{(DIFF_{(I,J-1)} + DIFF_{(I,J)} + DIFF_{(I,J+1)})} \quad (4)$$

$POS_J$ is the position of the driving line $TX_J$. $DIFF_{(I, J-1)}$ is a difference value corresponding to the first sensing line $RX_I$ and the driving line $TX_{J-1}$. $DIFF_{(I, J)}$ is the difference value corresponding to the first sensing line $RX_I$ and the driving line $TX_J$. $DIFF_{(I, J+1)}$ is a difference value corresponding to the first sensing line $RX_I$ and the driving line $TX_{J+1}$. $P_{TX}$ is a pitch between any two adjacent driving lines.

Furthermore, the difference value $DIFF_{(I,J)}$ corresponding to the first sensing line $RX_I$ and the driving line $TX_J$ (the middle driving line among the driving line $TX_{J-1}$, the driving line $TX_J$ and the driving line $TX_{J+1}$) can be multiplied by a weighting factor $W_{TX}$ for adjusting influence of the difference value $DIFF_{(I,J)}$, so as to improve accuracy of POS_TX. Accordingly, the equation (4) is rewritten as the following equation (5):

$$POS\_TX = POS_J + \frac{P_{TX} \times (DIFF_{(I,J+1)} - DIFF_{(I,J-1)})}{(DIFF_{(I,J-1)} + W_{TX} \times DIFF_{(I,J)} + DIFF_{(I,J+1)})} \quad (5)$$

Figure 1:
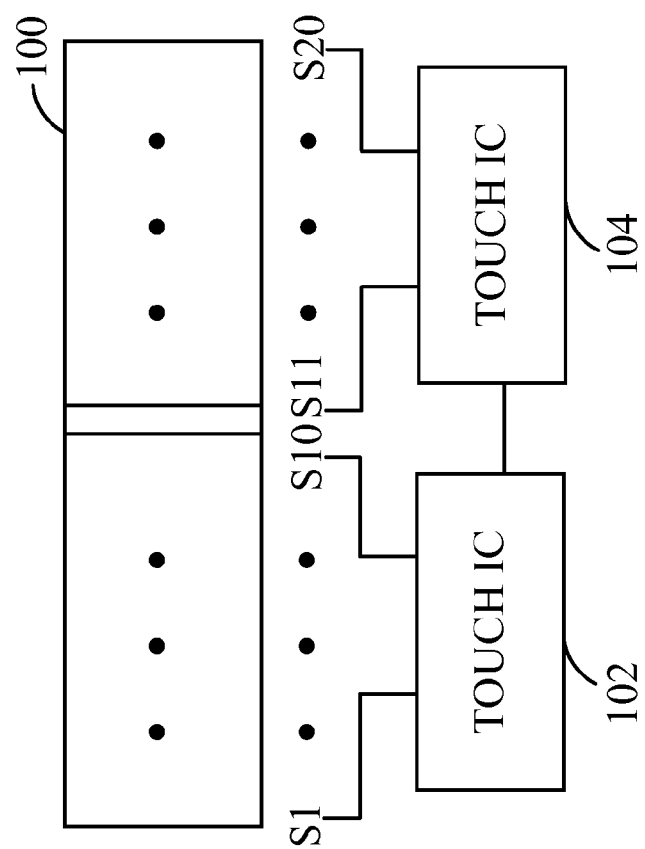
FIG. 1 is a conventional capacitive touch device.
Figure 2:
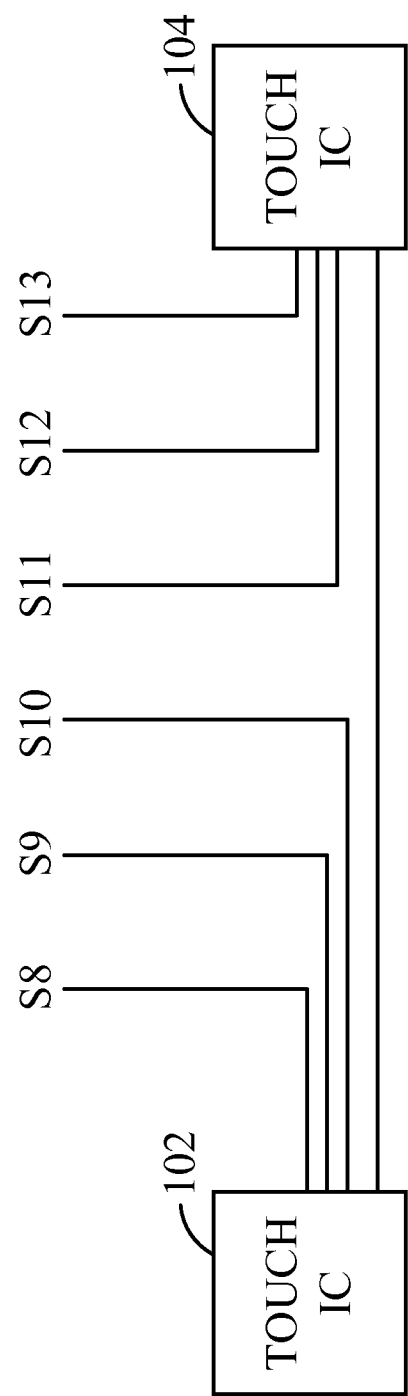
FIG. 2 is a schematic diagram showing that sensing lines S8-S13 and touch ICs 102, 104 in FIG. 1.

It can be understood from the equations (2)-(3) that the difference value $DIFF_{(I-1,J)}$, the difference value $DIFF_{(I,J)}$ and the difference value $DIFF_{(I+1,J)}$ are required when POS_RX is calculated. In the prior arts, the first touch detection unit 302 is not electrically coupled to the second sensing line $RX_{I+1}$ (referring to FIG. 1), and thus the difference value $DIFF_{(I+1,J)}$ cannot be obtained by the first touch detection unit 302. Accordingly, the second touch detection unit 304 has to transmit the difference value $DIFF_{(I+1,J)}$ (or the sensed value corresponding to the second sensing line $RX_{I+1}$ and the driving line $TX_J$) to the first touch detection unit 302, such that the first touch detection unit 302 can calculate POS_RX of the touch 310. Transmission and synchronization between the first and second touch detection units 302 and 304 cause the frame rate of the touch panel 300 to be reduced significantly. In the capacitive touch device 30 of the present invention, the first touch detection unit 302 is electrically coupled to the second sensing line $RX_{I+1}$, and thus the difference value $DIFF_{(I+1,J)}$ can be obtained by the first touch detection unit 302. As a result, the transmission and synchronization between the first and second touch detection units 302 and 304 are not required, and the problem that the frame rate of the touch panel 300 is reduced significantly can be avoided.

Since the first and second touch detection units 302, 304 are electrically coupled to the boundary sensing lines (i.e. the first and second sensing lines $RX_I$-$RX_{I+1}$), both of the first and second touch detection units 302, 304 can calculate the position (POS_RX, POS_TX) of the touch 310 by utilizing the above-mentioned interpolation method. The touch 310 which is detected by the first and second touch detection units 302, 304 can be merged as one touch. Any one of calculation results of the first and second touch detection units 302, 304 can be served as the position (POS_RX, POS_TX) of the touch 310. Alternatively, an average of the calculation results of the first and second touch detection units 302, 304 can be served as the position (POS_RX, POS_TX) of the touch 310.

Furthermore, when the driving unit 306 provides the driving signal including a plurality of pulses for each of the first and second sensing lines $RX_1$-$RX_M$, timing for generating the pulses with the driving unit 306 and timing for receiving the pulses with the first and second touch detection units 302, 304 should be synchronized or have a fixed delay time. That is, the first and second touch detection units 302, 304 should be synchronized as well. In one embodiment, the first and second touch detection units 302, 304 are synchronized by utilizing a signal line 312 which is electrically coupled therebetween. In another embodiment, the first touch detection unit 302 comprises a first counter 3020, and the second touch detection unit 304 comprises a second counter 3040. The first and second touch detection units 302, 304 are synchronized by the first and second counters 3020, 3040.

Based on characteristics of the first and second touch detection units 302, 304, the first and second touch detection units 302, 304 can scan the first sensing line $RX_I$ and the second sensing line $RX_{I+1}$ synchronously or in turn. If the first and second touch detection units 302, 304 scan the first sensing line $RX_I$ and the second sensing line $RX_{I+1}$ synchronously and scanning results are correct, it represents that the first and second touch detection units 302, 304 can scan the first sensing line $RX_I$ and the second sensing line $RX_{I+1}$ synchronously. If the first and second touch detection units 302, 304 scan the first sensing line $RX_I$ and the second sensing line $RX_{I+1}$ synchronously and the scanning results are affected or incorrect, it represents that the first and second touch detection units 302, 304 should scan the first sensing line $RX_I$ and the second sensing line $RX_{I+1}$ in turn.

Figure 5:
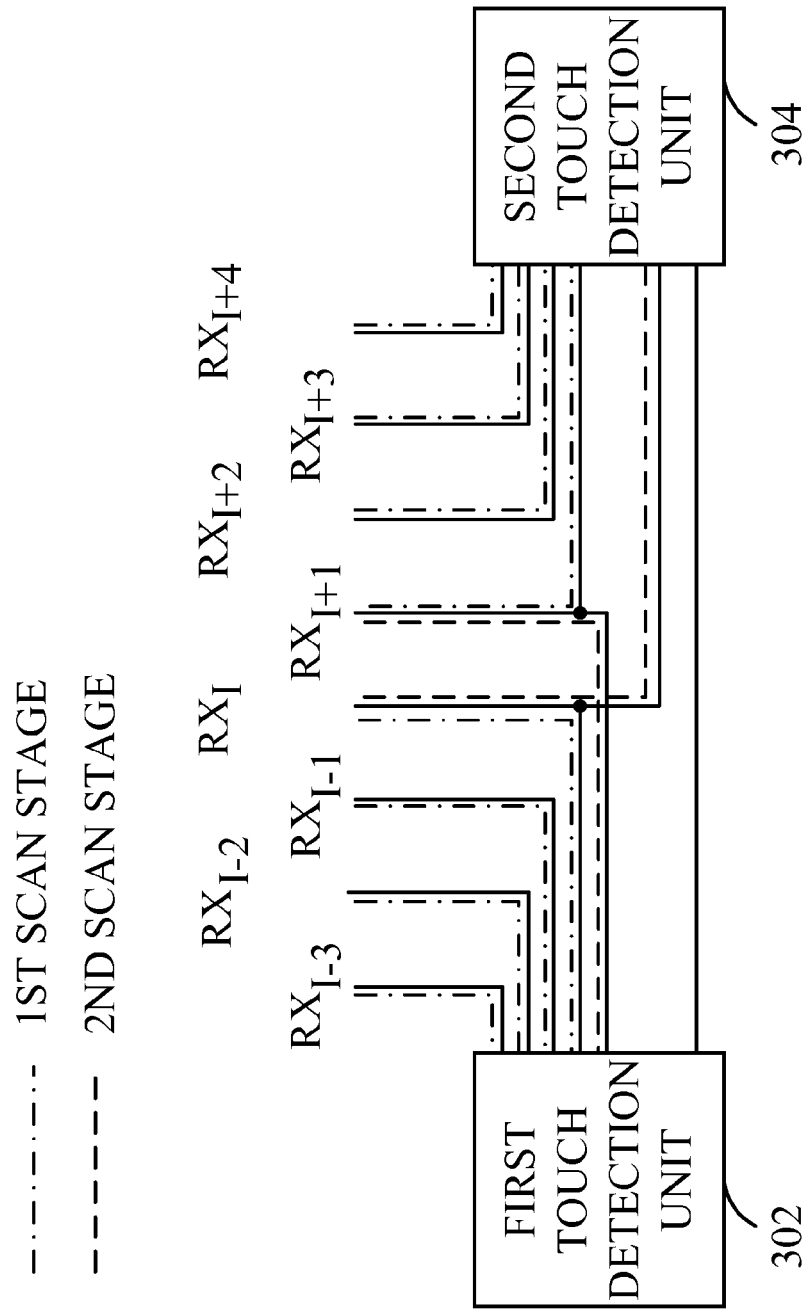
FIG. 5 is a schematic diagram showing an example of scanning the first sensing line $RX_I$ and the second scanning line $RX_{I+1}$ in FIG. 4 in turn.

Please refer to FIG. 5. FIG. 5 is a schematic diagram showing an example of scanning the first sensing line $RX_I$ and the second sensing line $RX_{I+1}$ in FIG. 4 in turn. In a first scanning stage, the first touch detection unit 302 scans the first sensing lines $RX_{I-3}$-$RX_I$, and the second touch detection unit 304 scans the second sensing lines $RX_{I+1}$-$RX_{I+4}$. In a second scanning stage, the first touch detection unit 302 scans the second sensing line $RX_{I+1}$, and the second touch detection unit 304 scans the first sensing line $RX_I$.

Figure 6:
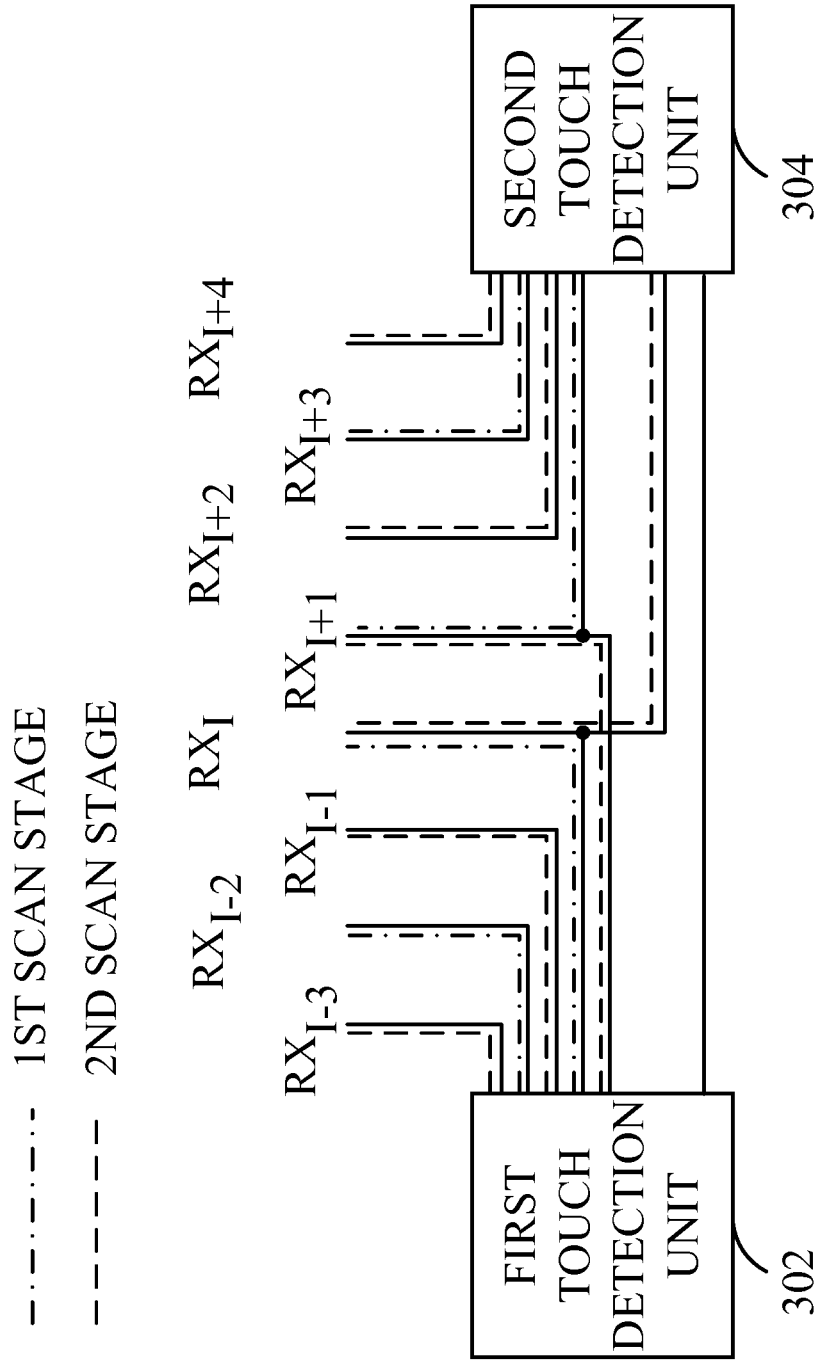
FIG. 6 is a schematic diagram showing another example of scanning the first sensing line $RX_I$ and the second sensing line $RX_{I+1}$ in FIG. 4 in turn.

Please refer to FIG. 6. FIG. 6 is a schematic diagram showing another example of scanning the first sensing line $RX_I$ and the second sensing line $RX_{I+1}$ in FIG. 4 in turn. In a first scanning stage, the first touch detection unit 302 scans the first sensing lines $RX_{I-2}$, $RX_I$, and the second touch detection unit 304 scans the second sensing lines $RX_{I+1}$, $RX_{I+3}$. In a second scanning stage, the first touch detection unit 302 scans the first sensing lines $RX_{I-1}$, $RX_{I-1}$ and the second sensing line $RX_{I+1}$, and the second touch detection unit 304 scans the first sensing line $RX_I$ and the second sensing lines $RX_{I+2}$, $RX_{I+4}$.

Figure 7:
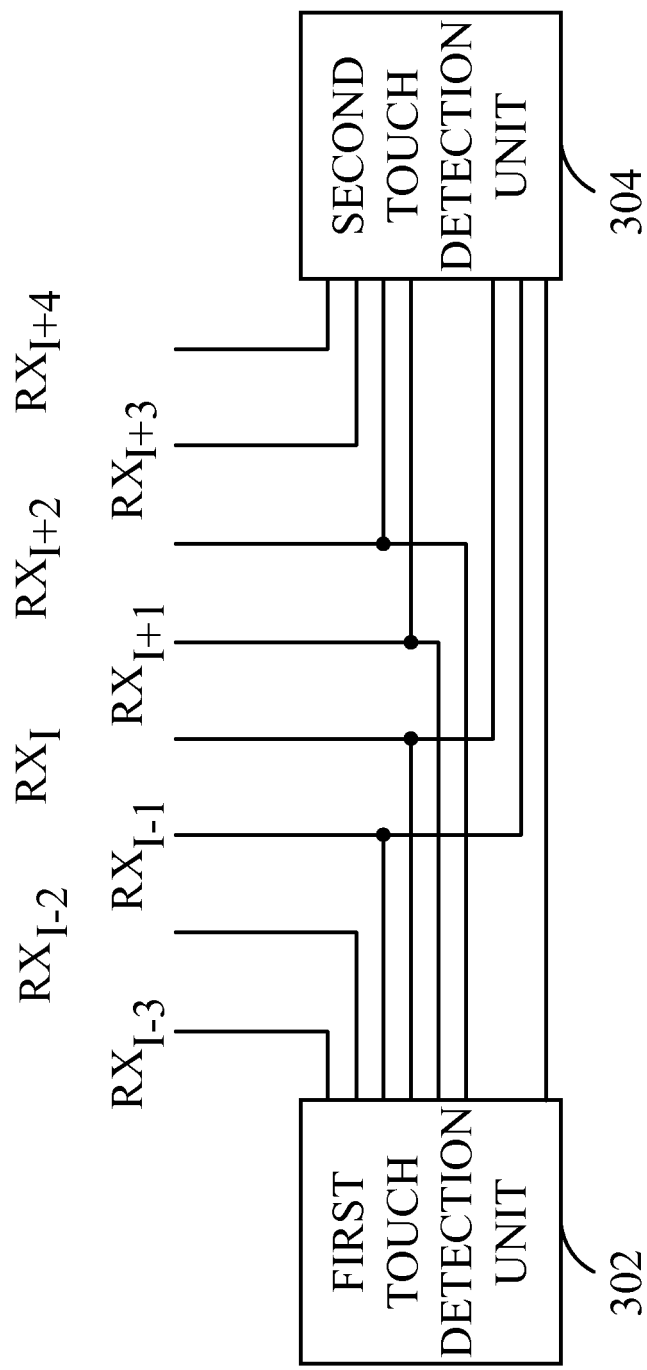
FIG. 7 is a schematic diagram showing that the first and second sensing lines $RX_{I-3}$-$RX_{I-4}$ and the first and second touch detection units in FIG. 3 according to a second embodiment of the present invention.

Please refer to FIG. 7. FIG. 7 is a schematic diagram showing that the first and second sensing lines $RX_{I-3}$-$RX_{I+4}$ and the first and second touch detection units 302, 304 in FIG. 3 according to a second embodiment of the present invention. In the present embodiment, the first touch detection unit 302 is electrically coupled to the first sensing lines $RX_{I-3}$-$RX_I$ and the second sensing lines $RX_{I+1}$-$RX_{I+2}$ for scanning the first sensing lines $RX_{I-3}$-$RX_I$ and the second sensing lines $RX_{I+1}$-$RX_{I+2}$. The second touch detection unit 304 is electrically coupled to the first sensing lines $RX_{I-1}$-$RX_I$ and the second sensing lines $RX_{I+1}$-$RX_{I+4}$ for scanning the first sensing lines $RX_{I-1}$-$RX_I$ and the second sensing lines $RX_{I+1}$-$RX_{I+4}$. In the first embodiment as shown in FIG. 4, each of the first and second touch detection units 302, 304 is electrically coupled to two boundary sensing lines (i.e. $RX_I$-$RX_{I+1}$). In the second embodiment as shown in FIG. 7, each of the first and second touch detection units 302, 304 is electrically coupled to four boundary sensing lines (i.e. $RX_{I-1}$-$RX_{I+2}$) for improving the accuracy. In the second embodiment as shown in FIG. 7, when a touch is positioned between the first sensing line $RX_I$ and the second sensing line $RX_{I+1}$, a position (i.e. a coordinate) of the touch can be obtained by the difference values of the first sensing lines $RX_{I-1}$, $RX_I$ and the second sensing lines $RX_{I+1}$, $RX_{I+2}$. The steps of the interpolation method in the second embodiment are the same as those in the first embodiment described above and not repeated herein.

Figure 8:
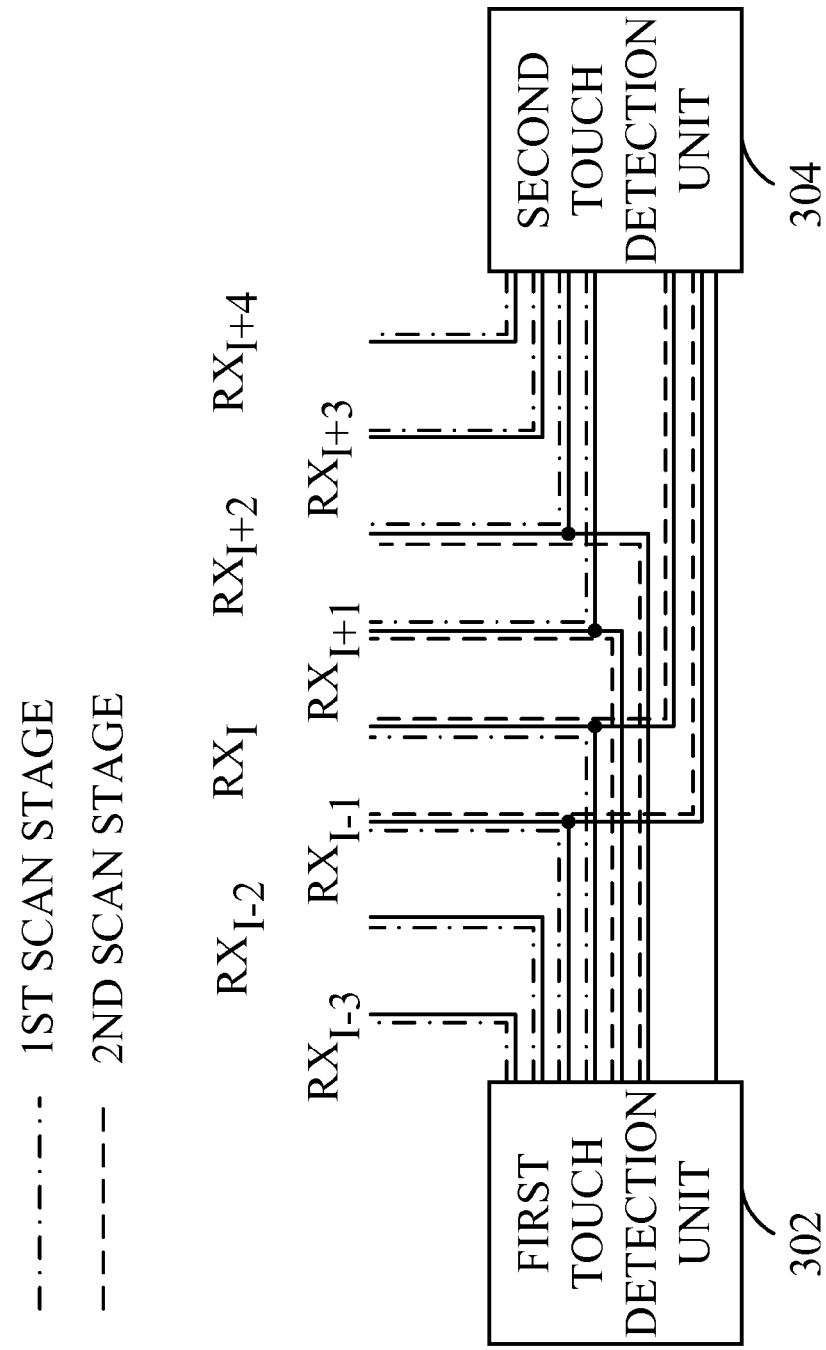
FIG. 8 is a schematic diagram showing an example of scanning the first sensing lines $RX_{I-1}$-$RX_I$ and the second sensing lines $RX_{I+1}$-$RX_{I+2}$ in FIG. 7 in turn.

Please refer to FIG. 8. FIG. 8 is a schematic diagram showing an example of scanning the first sensing lines $RX_{I-1}$-$RX_I$ and the second sensing lines $RX_{I+}$-$RX_{I+2}$ in FIG. 7 in turn. In a first scanning stage, the first touch detection unit 302 scans the first sensing lines $RX_{I-3}$-$RX_I$, and the second touch detection unit 304 scans the second sensing lines $RX_{I+1}$-$RX_{I+4}$. In a second scanning stage, the first touch detection unit 302 scans the second sensing lines $RX_{I+1}$-$RX_{I+2}$, and the second touch detection unit 304 scans the first sensing lines $RX_{I-1}$-$RX_I$.

Figure 9:
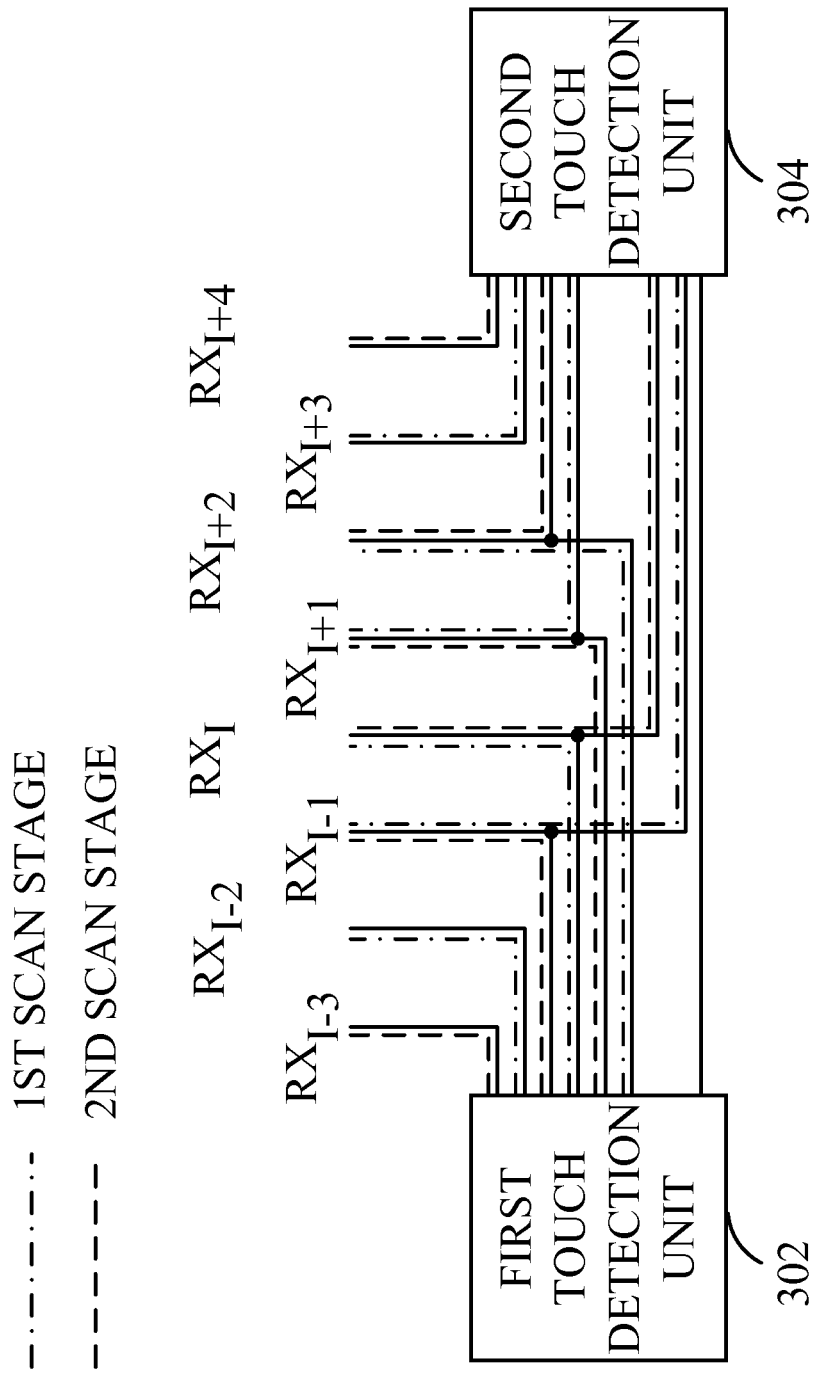
FIG. 9 is a schematic diagram showing another example of scanning the first sensing lines $RX_{I-1}$-$RX_I$ and the second sensing lines $RX_{I+1}$-$RX_{I+2}$ in FIG. 7 in turn.

Please refer to FIG. 9. FIG. 9 is a schematic diagram showing another example of scanning the first sensing lines $RX_{I-1}$-$RX_I$ and the second sensing lines $RX_{I+1}$-$RX_{I+2}$ in FIG. 7 in turn. In a first scanning stage, the first touch detection unit 302 scans the first sensing lines $RX_{I-2}$, $RX_I$ and the second sensing line $RX_{I+2}$, and the second touch detection unit 304 scans the first sensing lines $RX_{I-1}$ and the second sensing lines $RX_{I+1}$, $RX_{I+3}$. In a second scanning stage, the first touch detection unit 302 scans the first sensing lines $RX_{I-3}$, $RX_{I-1}$ and the second sensing line $RX_{I+1}$, and the second touch detection unit 304 scans the first sensing line $RX_I$ and the second sensing lines $RX_{I+2}$, $RX_{I+4}$.

Figure 10:
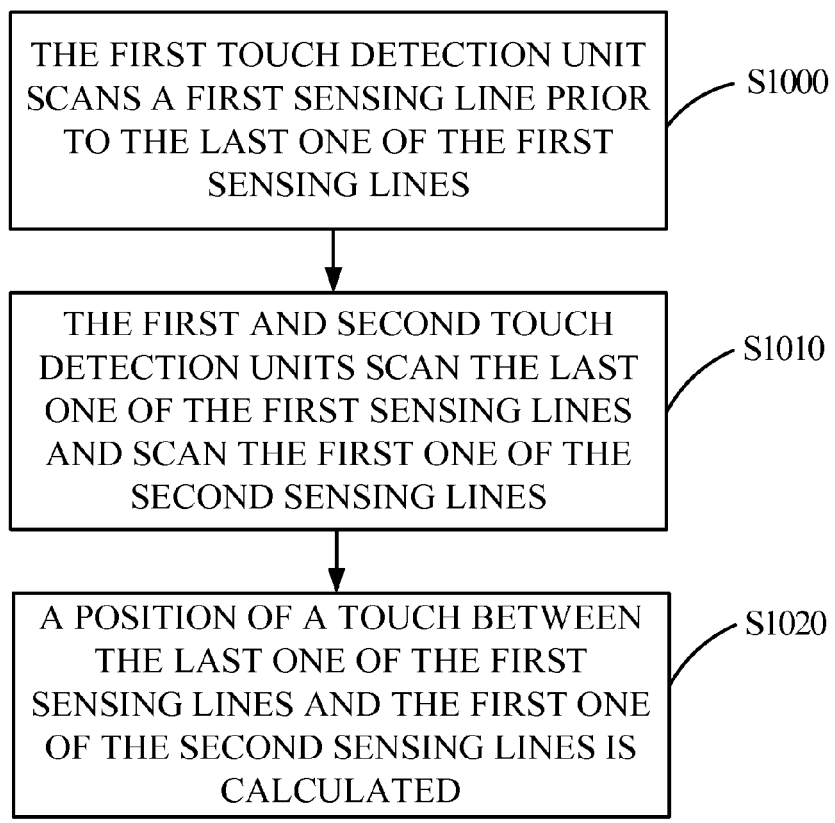
FIG. 10 is a flow chart showing a sensing method of a capacitive touch device according to an embodiment of the present invention.

Please refer to FIG. 10. FIG. 10 is a flow chart showing a sensing method of a capacitive touch device according to an embodiment of the present invention.

The capacitive touch device comprises a touch panel and a plurality of touch detection units. The touch panel comprises a plurality of first sensing lines and a plurality of second sensing lines. The touch detection units at least comprise a first touch detection unit electrically coupled to the first sensing lines and a second touch detection unit electrically coupled to the second sensing lines. At least a last one of the first sensing lines is further electrically coupled to the second touch detection unit. At least a first one of the second sensing lines is further electrically coupled to the first touch detection unit. The sensing method of the capacitive touch device of the present invention comprises the following steps.

In step S1000, the first touch detection unit scans a first sensing line prior to the last one of the first sensing lines for obtaining a sensed value corresponding to the first sensing line prior to the last one of the first sensing lines.

In step S1010, the first and second touch detection units scan the last one of the first sensing lines for obtaining a sensed value corresponding to the last one of the first sensing lines and scan the first one of the second sensing lines for obtaining a sensed value corresponding to the first one of the second sensing lines.

In one embodiment, the first and second touch detection units synchronously scan the last one of the first sensing lines for obtaining the sensed value corresponding to the last one of the first sensing lines and synchronously scan the first one of the second sensing lines for obtaining the sensed value corresponding to the first one of the second sensing lines.

In another embodiment, step S1010 comprises two scanning stage.

In a first scanning stage, the first touch detection unit scans the last one of the first sensing lines, and the second touch detection unit scans the first one of the second sensing lines.

In a second scanning stage, the first touch detection unit scans the first one of the second sensing lines, and the second touch detection unit scans the last one of the first sensing lines.

In step S1020, a position of a touch between the last one of the first sensing lines and the first one of the second sensing lines is calculated according to the sensed value corresponding to the first sensing line prior to the last one of the first sensing lines, the sensed value corresponding to the last one of the first sensing lines and the sensed value corresponding to the first one of the second sensing lines.

In one embodiment, the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + DIFF_{(I,J)} + DIFF_{(I+1,J)})}$$

$POS_I$ is the position of the last one of the first sensing line. $DIFF_{(I-1, J)}$ is a difference value between the sensed value corresponding to the first sensing line prior to the last one of the first sensing lines when the touch occurs and a sensed value corresponding to the first sensing line prior to the last one of the first sensing lines when there is no touch. $DIFF_{(I, J)}$ is a difference value between the sensed value corresponding to the last one of the first sensing lines when the touch occurs and a sensed value corresponding to the last one of the first sensing lines when there is no touch. $DIFF_{(I+1, J)}$ is a difference value between the sensed value corresponding to the first one of the second sensing lines when the touch occurs and a sensed value corresponding to the first one of the second sensing lines when there is no touch. $P_{RX}$ is a pitch between two adjacent first sensing lines or a pitch between two adjacent second sensing lines.

In another embodiment, the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + W_{RX} \times DIFF_{(I,J)} + DIFF_{(I+1,J)})}$$

$W_{RX}$ is a weighting factor for improving the accuracy of the touch panel and ranged from 0 to 1.

The capacitive touch device and the sensing method of the capacitive touch device are capable of avoiding the problem that the frame rate is reduced significantly because of the data transmission between two adjacent touch detection units.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A capacitive touch device capable of avoiding a reduced frame rate, comprising:
    a touch panel comprising a plurality of first sensing lines and a plurality of second sensing lines; and
    a plurality of touch detection units at least comprising a first touch detection unit and a second touch detection unit, the first touch detection unit electrically coupled to the first sensing lines and the second touch detection unit electrically coupled to the second sensing lines,
    wherein at least a last one of the first sensing lines is further electrically coupled to the second touch detection unit, and at least a first one of the second sensing lines is further electrically coupled to the first touch detection unit, and a position POS_RX of a touch between the last one of the first sensing lines and the first one of the second sensing lines is calculated according to a sensed value corresponding to a first sensing line prior to the last one of the first sensing lines, a sensed value corresponding to the last one of the first sensing lines and a sensed value corresponding to the first one of the second sensing lines,
    wherein the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + DIFF_{(I,J)} + DIFF_{(I+1,J)})}$$

wherein $POS_I$ is a position of the last one of the first sensing lines, $DIFF_{(I-1,\,J)}$ is a difference value between the sensed value corresponding to the first sensing line prior to the last one of the first sensing lines when the touch occurs and a sensed value corresponding to the first sensing line prior to the last one of the first sensing lines when there is no touch, $DIFF_{(I,\,J)}$ is a difference value between the sensed value corresponding to the last one of the first sensing lines when the touch occurs and a sensed value corresponding to the last one of the first sensing lines when there is no touch, $DIFF_{(I+1,\,J)}$ is a difference value between the sensed value corresponding to the first one of the second sensing lines when the touch occurs and a sensed value corresponding to the first one of the second sensing lines when there is no touch, and $P_{RX}$ is a pitch between two adjacent ones of the first sensing lines or a pitch between two adjacent ones of the second sensing lines.

2. The capacitive touch device capable of avoiding a reduced frame rate of claim 1, further comprising a plurality of driving lines arranged crossing over the first sensing lines and the second sensing lines.

3. The capacitive touch device capable of avoiding a reduced frame rate of claim 2, further comprising a driving unit electrically coupled to the driving lines for sequentially driving the driving lines.

4. The capacitive touch device capable of avoiding a reduced frame rate of claim 1, wherein the first and second touch detection units are synchronized by utilizing a signal line which is electrically coupled therebetween.

5. The capacitive touch device capable of avoiding a reduced frame rate of claim 1, wherein the first touch detection unit comprises a first counter, the second touch detection unit comprises a second counter, and the first and second touch detection units are synchronized by the first and second counters.

6. The capacitive touch device capable of avoiding a reduced frame rate of claim 1, wherein the first and second touch detection units scan the last one of the first sensing lines and the first one of the second sensing lines synchronously.

7. The capacitive touch device capable of avoiding a reduced frame rate of claim 1, wherein the first touch detection unit scans the last one of the first sensing lines and the second touch detection unit scans the first one of the second sensing lines in a first scanning stage, and the first touch detection unit scans the first one of the second sensing lines and the second touch detection unit scans the last one of the first sensing lines in a second scanning stage.

8. A capacitive touch device capable of avoiding a reduced frame rate, comprising:
    a touch panel comprising a plurality of first sensing lines and a plurality of second sensing lines; and
    a plurality of touch detection units at least comprising a first touch detection unit and a second touch detection unit, the first touch detection unit electrically coupled to the first sensing lines and the second touch detection unit electrically coupled to the second sensing lines,
    wherein at least a last one of the first sensing lines is further electrically coupled to the second touch detection unit, and at least a first one of the second sensing lines is further electrically coupled to the first touch detection unit, and a position POS_RX of a touch between the last one of the first sensing lines and the first one of the second sensing lines is calculated according to a sensed value corresponding to a first sensing line prior to the last one of the first sensing lines, a sensed value corresponding to the last one of the first sensing lines and a sensed value corresponding to the first one of the second sensing lines,
    wherein the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + W_{RX} \times DIFF_{(I,J)} + DIFF_{(I+1,J)})}$$

wherein $POS_I$ is a position of the last one of the first sensing lines, $DIFF_{(I-1,\,J)}$ is a difference value between the sensed value corresponding to the first sensing line prior to the last one of the first sensing lines when the touch occurs and a sensed value corresponding to the first sensing line prior to the last one of the first sensing lines when there is no touch, $DIFF_{(I,\,J)}$ is a difference value between the sensed value corresponding to the last one of the first sensing lines when the touch occurs and a sensed value corresponding to the last one of the first sensing lines when there is no touch, $DIFF_{(I+1, J)}$ is a difference value between the sensed value corresponding to the first one of the second sensing lines when the touch occurs and a sensed value corresponding to the first one of the second sensing lines when there is no touch, $P_{RX}$ is a pitch between two adjacent ones of the first sensing lines or a pitch between two adjacent ones of the second sensing lines, and $W_{RX}$ is a weighting factor.

9. A sensing method of a capacitive touch device capable of avoiding a reduced frame rate, the capacitive touch device comprising a touch panel and a plurality of touch detection units, the touch panel comprising a plurality of first sensing lines and a plurality of second sensing lines, the touch detection units at least comprising a first touch detection unit electrically coupled to the first sensing lines and a second touch detection unit electrically coupled to the second sensing lines, at least a last one of the first sensing lines further electrically coupled to the second touch detection unit, at least a first one of the second sensing lines further electrically coupled to the first touch detection unit, the sensing method comprising:

scanning a first sensing line prior to the last one of the first sensing lines for obtaining a sensed value corresponding to the first sensing line prior to the last one of the first sensing lines with the first touch detection unit;

scanning the last one of the first sensing lines for obtaining a sensed value corresponding to the last one of the first sensing lines and scanning the first one of the second sensing lines for obtaining a sensed value corresponding to the first one of the second sensing lines with the first and second touch detection units; and calculating a position POS_RX of a touch between the last one of the first sensing lines and the first one of the second sensing lines according to the sensed value corresponding to the first sensing line prior to the last one of the first sensing lines, the sensed value corresponding to the last one of the first sensing lines and the sensed value corresponding to the first one of the second sensing lines, wherein the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + DIFF_{(I,J)} + DIFF_{(I+1,J)})}$$

wherein $POS_I$ is a position of the last one of the first sensing lines, $DIFF_{(I-1, J)}$ is a difference value between the sensed value corresponding to the first sensing line prior to the last one of the first sensing lines when the touch occurs and a sensed value corresponding to the first sensing line prior to the last one of the first sensing lines when there is no touch, $DIFF_{(I, J)}$ is a difference value between the sensed value corresponding to the last one of the first sensing lines when the touch occurs and a sensed value corresponding to the last one of the first sensing lines when there is no touch, $DIFF_{(I+1, J)}$ is a difference value between the sensed value corresponding to the first one of the second sensing lines when the touch occurs and a sensed value corresponding to the first one of the second sensing lines when there is no touch, and $P_{RX}$ is a pitch between two adjacent ones of the first sensing lines or a pitch between two adjacent ones of the second sensing lines.

10. The sensing method of the capacitive touch device capable of avoiding a reduced frame rate of claim 9, wherein the first and second touch detection units synchronously scan the last one of the first sensing lines for obtaining the sensed value corresponding to the last one of the first sensing lines and synchronously scan the first one of the second sensing lines for obtaining the sensed value corresponding to the first one of the second sensing lines.

11. The sensing method of the capacitive touch device capable of avoiding a reduced frame rate of claim 9, wherein the step of scanning the last one of the first sensing lines for obtaining the sensed value corresponding to the last one of the first sensing lines and scanning the first one of the second sensing lines for obtaining the sensed value corresponding to the first one of the second sensing lines with the first and second touch detection units comprises two scanning stage:

scanning the last one of the first sensing lines with the first touch detection unit and scanning the first one of the second sensing lines with the second touch detection unit in a first scanning stage; and scanning the first one of the second sensing lines with the first touch detection unit and scanning the last one of the first sensing lines with the second touch detection unit in a second scanning stage.

12. A sensing method of a capacitive touch device capable of avoiding a reduced frame rate, the capacitive touch device comprising a touch panel and a plurality of touch detection units, the touch panel comprising a plurality of first sensing lines and a plurality of second sensing lines, the touch detection units at least comprising a first touch detection unit electrically coupled to the first sensing lines and a second touch detection unit electrically coupled to the second sensing lines, at least a last one of the first sensing lines further electrically coupled to the second touch detection unit, at least a first one of the second sensing lines further electrically coupled to the first touch detection unit, the sensing method comprising:

scanning a first sensing line prior to the last one of the first sensing lines for obtaining a sensed value corresponding to the first sensing line prior to the last one of the first sensing lines with the first touch detection unit;

scanning the last one of the first sensing lines for obtaining a sensed value corresponding to the last one of the first sensing lines and scanning the first one of the second sensing lines for obtaining a sensed value corresponding to the first one of the second sensing lines with the first and second touch detection units; and calculating a position POS_RX of a touch between the last one of the first sensing lines and the first one of the second sensing lines according to the sensed value corresponding to the first sensing line prior to the last one of the first sensing lines, the sensed value corresponding to the last one of the first sensing lines and the sensed value corresponding to the first one of the second sensing lines, wherein the position POS_RX of the touch is calculated according to the following equation:

$$POS\_RX = POS_I + \frac{P_{RX} \times (DIFF_{(I+1,J)} - DIFF_{(I-1,J)})}{(DIFF_{(I-1,J)} + W_{RX} \times DIFF_{(I,J)} + DIFF_{(I+1,J)})}$$

wherein $POS_I$ is a position of the last one of the first sensing lines, $DIFF_{(I-1, J)}$ is a difference value between the sensed value corresponding to the first sensing line prior to the last one of the first sensing lines when the touch occurs and a sensed value corresponding to the first sensing line prior to the last one of the first sensing lines when there is no touch, $DIFF_{(I, J)}$ is a difference value between the sensed value corresponding to the last one of the first sensing lines when the touch occurs and a sensed value corresponding to the last one of the first sensing lines when there is no touch, $DIFF_{(I+1, J)}$ is a difference value between the sensed value corresponding to the first one of the second sensing lines when the touch occurs and a sensed value corresponding to the first one of the second sensing lines when there is no touch, $P_{RX}$ is a pitch between two adjacent ones of the first sensing lines or a pitch between two adjacent ones of the second sensing lines, and $W_{RX}$ is a weighting factor.

* * * * *